M. E. WICKWIRE.
ANTISLIPPING DEVICE.
APPLICATION FILED MAY 28, 1917.

1,239,856.

Patented Sept. 11, 1917.

Inventor
MILFORD E. WICKWIRE
By Watson E. Coleman
Attorney

UNITED STATES PATENT OFFICE.

MILFORD E. WICKWIRE, OF LEHIGH, IOWA.

ANTISLIPPING DEVICE.

1,239,856. Specification of Letters Patent. Patented Sept. 11, 1917.

Application filed May 28, 1917. Serial No. 171,452.

*To all whom it may concern:*

Be it known that I, MILFORD E. WICKWIRE, a citizen of the United States, residing at Lehigh, in the county of Webster and State of Iowa, have invented certain new and useful Improvements in Antislipping Devices, of which the following is a specification, reference being had to the accompanying drawings.

This invention relates to certain improvements in anti-slipping devices and it is an object of the invention to provide a device of this general character which, when applied to the tire of the wheel, effectually serves to hold the wheel against slipping.

The invention consists in the details of construction and in the combination and arrangement of the several parts of my improved anti-slipping device whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1:
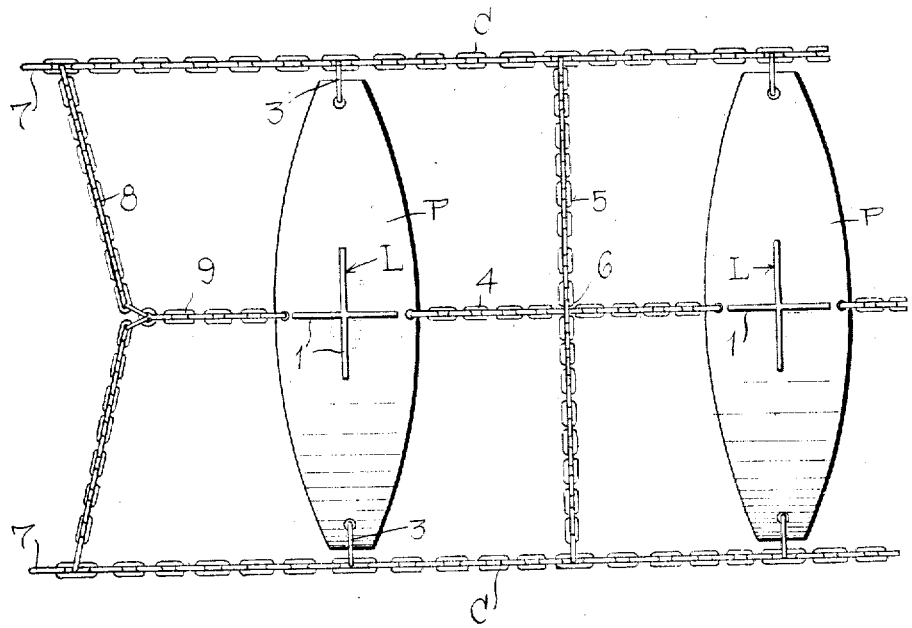
Figure 2:
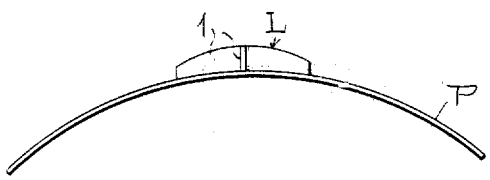

Figure 1 is a fragmentary view in top plan of an anti-slipping device constructed in accordance with an embodiment of my invention; and Fig. 2 is a view in side elevation of one of the plates as herein included.

As disclosed in the accompanying drawings, my improved anti-slipping device comprises a plurality of longitudinally spaced plates P formed of resilient material and adapted to overlie the tread portion of a tire and disposed transversely thereof.

Each of the plates P is substantially elliptical in form and is provided at its center with a lug L comprising blades or ribs 1 arranged in crossed relation and preferably perpendicularly disposed.

Operatively engaged with the opposite end portions of each of the plates P are the links 3 also secured to adjacent side chains C. The adjacent plates P at substantially their longitudinal centers have their opposed marginal portions connected by the flexible member or chain 4 disposed longitudinally of the anti-slipping device or circumferentially of the tire when the improved device is in applied position. The cross chains 5 connect the side chains C to each other and to the tread chains 4 as indicated at 6.

Fig. 1 of the drawings particularly illustrates an end portion of my improved anti-slipping device and it is to be understood that the links 7 of the side chains C are adapted to be suitably secured to the opposite end portions of said side chains. Each end portion of the side chains C is also connected by the transversely disposed flexible member or chain 8 of a length greater than that of the transverse chains or members 5 hereinbefore referred to and the intermediate portion of said member or chain 8 is connected through the medium of the flexible member or chain 9 with the central portion of the longitudinal margin of the adjacent plate P.

From the foregoing description, it is thought to be obvious that an anti-slipping device constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

An anti-slipping device comprising side chains the ends of each chain being adapted to be secured one to the other, elongated flexible plates interposed between said side chains, links connecting the end portions of the plates to the side chains, flexible members connecting the side chains intermediate each pair of adjacent plates, flexible members connecting the opposed longitudinal marginal portions of adjacent plates, said last named flexible members being secured to the first named flexible members, a transversely disposed flexible member connecting the corresponding end portions of the side chains, said last named flexible member being of a length greater than the first named flexible member, and a flexible member connecting the last named flexible member and the adjacent end plate at substantially the longitudinal centers thereof.

In testimony whereof I hereunto affix my signature in the presence of two witnesses.

MILFORD E. WICKWIRE.

Witnesses:
C. G. SIEGEL,
C. E. DANIELS.